(12) United States Patent
Sumino et al.

(10) Patent No.: US 12,442,160 B2
(45) Date of Patent: Oct. 14, 2025

(54) HYDRAULIC SYSTEM, EXCAVATOR, AND CONTROL METHOD OF EXCAVATOR

(71) Applicant: Komatsu Ltd., Tokyo (JP)

(72) Inventors: Wataru Sumino, Tokyo (JP); Daisuke Kozuka, Tokyo (JP); Akira Hasebe, Tokyo (JP); Masatoshi Ikeda, Tokyo (JP)

(73) Assignee: KOMATSU LTD., Tokyo (JP)

(*) Notice: Subject to any disclaimer, the term of this patent is extended or adjusted under 35 U.S.C. 154(b) by 36 days.

(21) Appl. No.: 18/684,718

(22) PCT Filed: Aug. 10, 2022

(86) PCT No.: PCT/JP2022/030565
§ 371 (c)(1),
(2) Date: Oct. 15, 2024

(87) PCT Pub. No.: WO2023/053736
PCT Pub. Date: Apr. 6, 2023

(65) Prior Publication Data
US 2025/0290287 A1 Sep. 18, 2025

(30) Foreign Application Priority Data
Sep. 30, 2021 (JP) .................... 2021-160635

(51) Int. Cl.
*E02F 9/22* (2006.01)
*E02F 9/12* (2006.01)
(Continued)

(52) U.S. Cl.
CPC ............ *E02F 9/2203* (2013.01); *E02F 9/123* (2013.01); *E02F 9/2289* (2013.01);
(Continued)

(58) Field of Classification Search
CPC .... F15B 11/17; F15B 21/042; F15B 21/0423; F15B 21/0427; F15B 2211/3116;
(Continued)

(56) References Cited

U.S. PATENT DOCUMENTS 4,373,869 A 2/1983 Martin et al.
7,565,801 B2 * 7/2009 Tozawa ................. E02F 9/2075
60/486

(Continued)

FOREIGN PATENT DOCUMENTS

JP 2005-291312 A 10/2005
JP 2006-336844 A 12/2006
(Continued)

*Primary Examiner* — Michael Leslie
(74) *Attorney, Agent, or Firm* — Troutman Pepper Locke LLP

(57) ABSTRACT

A control method of an excavator including: a first circuit of an open circuit including a main valve controlling inflow of hydraulic oil from a main pump to a working equipment cylinder, and a tank to which the oil flowed out of the cylinder is ejected via the main valve; a second circuit of a closed circuit including a first valve between swing pump and motor; and a second valve on a first passage between the main valve and the tank, adjusting back pressure of the main valve, the control method includes: causing the oil to flow into a second passage around a spool of the first valve from an upstream portion of the first passage between the main valve and the second valve; and causing the oil to flow out of the second passage to a downstream portion of the first passage between the second valve and the tank.

9 Claims, 5 Drawing Sheets

(51) Int. Cl.
  *F15B 11/17* (2006.01)
  *F15B 21/0427* (2019.01)
  *F16K 49/00* (2006.01)
(52) U.S. Cl.
  CPC ............ *E02F 9/2292* (2013.01); *F15B 11/17* (2013.01); *F15B 21/0427* (2019.01); *E02F 9/2296* (2013.01); *F15B 2211/3116* (2013.01); *F16K 49/005* (2013.01)
(58) Field of Classification Search
  CPC ....... F15B 2211/62; E02F 9/123; E02F 9/125; E02F 9/226; E02F 9/2289; E02F 9/2292; F16K 49/005; F16K 49/007; Y10T 137/6579
  See application file for complete search history.

(56) References Cited

U.S. PATENT DOCUMENTS

| | | | |
|---|---|---|---|
| 10,233,613 B2* | 3/2019 | Honda | E02F 9/2217 |
| 10,294,633 B2* | 5/2019 | Kondo | F15B 11/0406 |
| 11,009,051 B2* | 5/2021 | Biwersi | F15B 13/0402 |
| 11,852,262 B2* | 12/2023 | Wang | F16K 49/005 |
| 11,898,658 B1* | 2/2024 | Vlassoff | F16K 27/02 |
| 12,168,857 B2* | 12/2024 | Sumino | E02F 9/2066 |
| 2005/0229594 A1 | 10/2005 | Nanjo et al. | |
| 2008/0314038 A1 | 12/2008 | Tozawa et al. | |
| 2015/0354605 A1 | 12/2015 | Ueda et al. | |
| 2016/0177539 A1 | 6/2016 | Hiraku et al. | |
| 2020/0024830 A1 | 1/2020 | Honda et al. | |
| 2022/0034335 A1 | 2/2022 | Ueda | |
| 2022/0074170 A1 | 3/2022 | Kai et al. | |

FOREIGN PATENT DOCUMENTS

| | | |
|---|---|---|
| JP | 5809544 B2 | 11/2015 |
| JP | 2016-118281 A | 6/2016 |
| JP | 5954360 B2 | 7/2016 |
| JP | 2020-12350 A | 1/2020 |
| JP | 2020-51583 A | 4/2020 |
| JP | 2020-139574 A | 9/2020 |
| JP | 2021-148213 A | 9/2021 |

* cited by examiner

HYDRAULIC SYSTEM, EXCAVATOR, AND CONTROL METHOD OF EXCAVATOR

FIELD

The present disclosure relates to a hydraulic system, an excavator, and a control method of the excavator.

BACKGROUND

In a technical field relating to the excavator, the excavator disclosed in Patent Literature 1 is known.

CITATION LIST

Patent Literature

Patent Literature 1: JP 5954360 B2

SUMMARY

Technical Problem

An excavator includes plural pieces of hydraulic equipment. In starting the excavator, the hydraulic equipment is warmed up in some cases. For example, if high-temperature hydraulic oil is suddenly supplied to the hydraulic equipment that has not been warmed up, there is a possibility of the occurrence of malfunction in the hydraulic equipment.

It is an object of the present disclosure to warm air in hydraulic equipment equipped in an excavator.

Solution to Problem

According to an aspect of the present invention, a hydraulic system comprises: a main hydraulic valve that is constituted by an open circuit that includes a main pump, a working equipment cylinder, a main valve that controls inflow of hydraulic oil from the main pump to the working equipment cylinder, and a tank to which the hydraulic oil that has flowed out of the working equipment cylinder is ejected via the main valve; a swing hydraulic circuit that is constituted by a closed circuit that includes a swing pump, a swing motor, and a neutral hold valve that controls passing of the hydraulic oil between the swing pump and the swing motor; a back pressure valve that is disposed on a tank flow passage between the main valve and the tank, and adjusts back pressure of the main valve; a warming-up flow passage that is disposed around a spool of the neutral hold valve; a supply flow passage that connects an upstream portion of the tank flow passage between the main valve and the back pressure valve to an entrance port of the warming-up flow passage; and an ejection flow passage that connects a downstream portion of the tank flow passage between the back pressure valve and the tank to an exit port of the warming-up flow passage.

Advantageous Effects of Invention

According to the present disclosure, hydraulic equipment equipped in an excavator is warmed up.

DESCRIPTION OF EMBODIMENTS

Embodiments according to the present disclosure will be described below with reference to the drawings, but the present disclosure is not limited to the embodiments. Components of the respective embodiments described below can be appropriately combined. Furthermore, some components are not used in some cases.

[Excavator]

Figure 1:
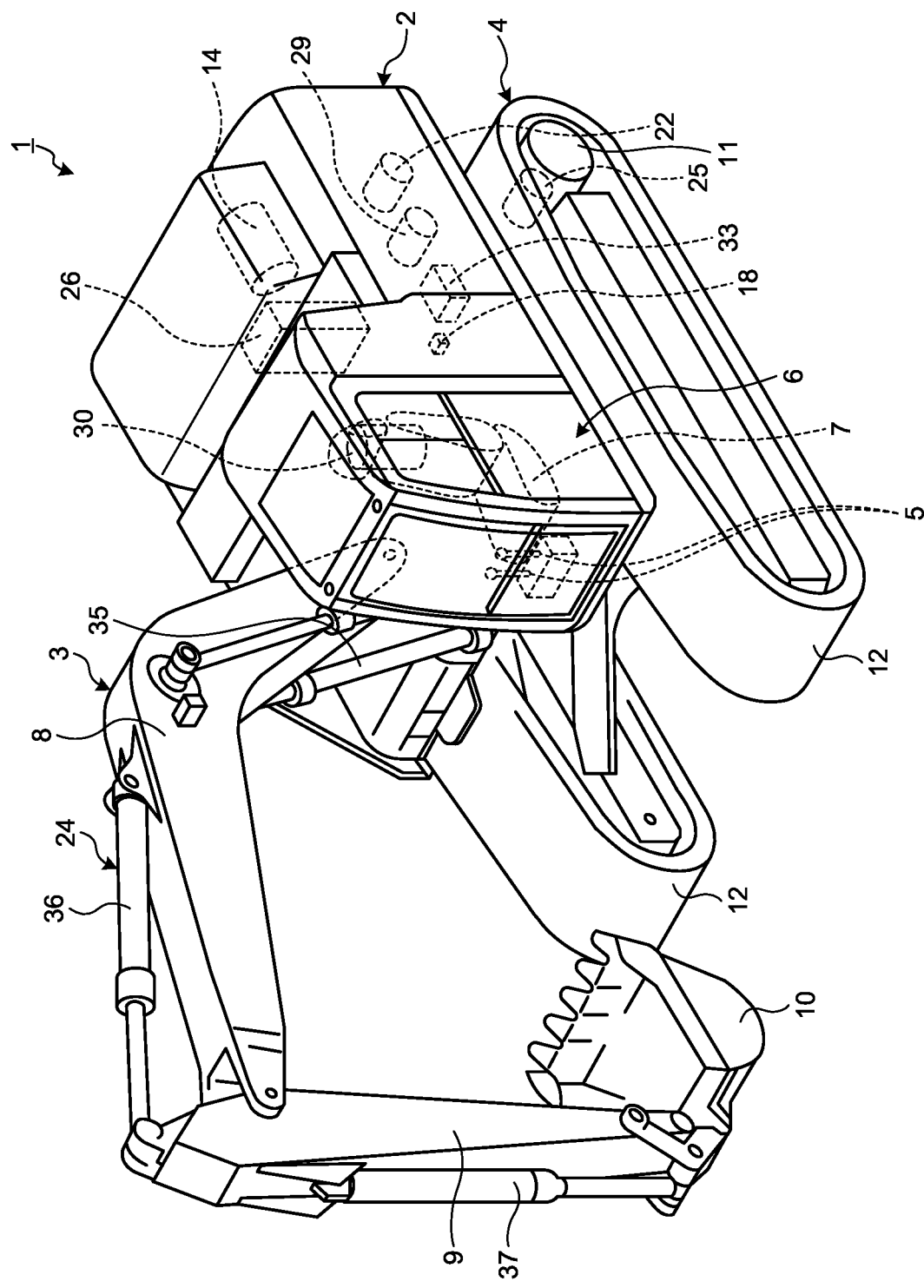
FIG. 1 is a perspective view illustrating an excavator according to an embodiment.

FIG. 1 is a perspective view illustrating an excavator 1 according to an embodiment. As illustrated in FIG. 1, the excavator 1 includes an upper swing body 2, working equipment 3, a lower travel body 4, and an operation lever 5.

The upper swing body 2 is swingably supported by the lower travel body 4. The upper swing body 2 supports the working equipment 3. The upper swing body 2 includes a cab 6. An operator of the excavator 1 gets in the cab 6. A driver's seat 7 on which the operator sits is provided in the cab 6.

The working equipment 3 is coupled to the upper swing body 2. The working equipment 3 includes a boom 8, an arm 9, and a bucket 10. The boom 8 is rotatably coupled to the upper swing body 2. The arm 9 is rotatably coupled to the boom 8. The bucket 10 is rotatably coupled to the arm 9.

The lower travel body 4 supports the upper swing body 2. The lower travel body 4 includes a drive wheel 11 and a crawler 12. The rotation of the drive wheel 11 causes the crawler 12 to rotate. The rotation of the crawler 12 causes the lower travel body 4 to travel.

The operation lever 5 is operated by the operator of the excavator 1. The operation lever 5 is operated to operate each of the upper swing body 2, the working equipment 3, and the lower travel body 4. The operation lever 5 is disposed in the cab 6.

[Hydraulic System]

Figure 2:
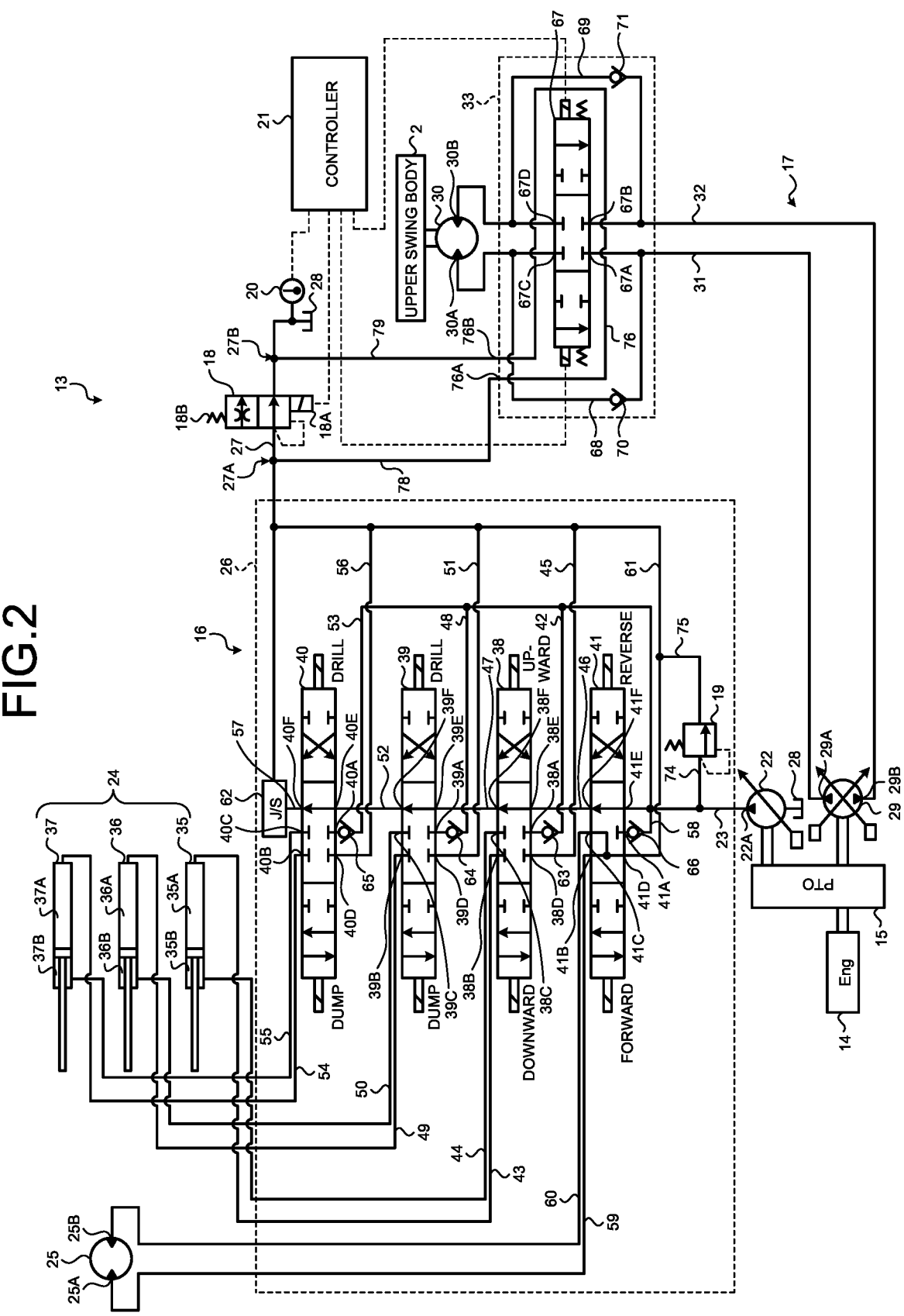
FIG. 2 is a diagram illustrating a hydraulic system according to the embodiment.

FIG. 2 is a diagram illustrating a hydraulic system 13 according to the embodiment. The hydraulic system 13 is equipped in the excavator 1. As illustrated in FIGS. 1 and 2, the hydraulic system 13 includes an engine 14, a power take-off 15, a main hydraulic circuit 16, a swing hydraulic circuit 17, a back pressure valve 18, a relief valve 19, a temperature sensor 20, and a controller 21.

The engine 14 is a power source of the excavator 1. An example of the engine 14 is a diesel engine. The engine 14 is coupled to the power take-off 15.

The main hydraulic circuit 16 operates at least one of the working equipment 3 and the lower travel body 4. Hydraulic oil for operating at least one of the working equipment 3 and the lower travel body 4 flows through the main hydraulic circuit 16. The main hydraulic circuit 16 includes a main pump 22, a pump flow passage 23, a working equipment cylinder 24, a travel motor 25, a main valve 26, a tank flow passage 27, and a tank 28. The main hydraulic circuit 16 is constituted by an open circuit.

The swing hydraulic circuit 17 operates the upper swing body 2. Hydraulic oil for operating the upper swing body 2 flows through the swing hydraulic circuit 17. The swing hydraulic circuit 17 includes a swing pump 29, a swing motor 30, a first main flow passage 31, a second main flow passage 32, and a neutral hold valve 33. The swing hydraulic circuit 17 is constituted by a closed circuit.

The power take-off 15 distributes power generated by the engine 14 to each of the main pump 22 and the swing pump 29.

<Main Hydraulic Circuit>

The main pump 22 is a variable displacement hydraulic pump. The main pump 22 is coupled to the power take-off 15. The main pump 22 is driven by the engine 14. The main pump 22 discharges hydraulic oil for driving each of the working equipment cylinder 24 and the travel motor 25.

The pump flow passage 23 is connected to a discharge port 22A of the main pump 22. Hydraulic oil that has been discharge from the discharge port 22A of the main pump 22 flows through the pump flow passage 23.

The working equipment cylinder 24 is a hydraulic cylinder. The working equipment cylinder 24 generates power for operating the working equipment 3. The working equipment cylinder 24 is driven on the basis of hydraulic oil that has been discharged from the main pump 22. The working equipment cylinder 24 includes a boom cylinder 35, an arm cylinder 36, and a bucket cylinder 37. The boom cylinder 35 operates the boom 8. The arm cylinder 36 operates the arm 9. The bucket cylinder 37 operates the bucket 10.

The travel motor 25 is a hydraulic motor. The travel motor 25 generates power for operating the lower travel body 4. The travel motor 25 is driven on the basis of hydraulic oil that has been discharged from the main pump 22. The travel motor 25 rotates the drive wheel 11.

The main valve 26 is connected via the pump flow passage 23 to the main pump 22. The main valve 26 controls the inflow of hydraulic oil from the main pump 22 to the working equipment cylinder 24. The main valve 26 also controls the inflow of hydraulic oil from the main pump 22 to the travel motor 25. The main valve 26 includes a boom spool 38, an arm spool 39, a bucket spool 40, and a travel spool 41.

The boom spool 38 controls the inflow of hydraulic oil from the main pump 22 to the boom cylinder 35. The boom spool 38 controls a flow rate and a direction of hydraulic oil to be supplied from the main pump 22 to the boom cylinder 35.

The arm spool 39 controls the inflow of hydraulic oil from the main pump 22 to the arm cylinder 36. The arm spool 39 controls a flow rate and a direction of hydraulic oil to be supplied from the main pump 22 to the arm cylinder 36.

The bucket spool 40 controls the inflow of hydraulic oil from the main pump 22 to the bucket cylinder 37. The bucket spool 40 controls a flow rate and a direction of hydraulic oil to be supplied from the main pump 22 to the bucket cylinder 37.

The travel spool 41 controls the inflow of hydraulic oil from the main pump 22 to the travel motor 25. The travel spool 41 controls a flow rate and a direction of hydraulic oil to be supplied to the travel motor 25.

The tank flow passage 27 is connected to the tank 28. Hydraulic oil that has flowed out of the working equipment cylinder 24 flows through the main valve 26, and then flows through the tank flow passage 27.

Hydraulic oil is ejected to the tank 28 from the tank flow passage 27. Hydraulic oil that has flowed out of the working equipment cylinder 24 is ejected via the main valve 26 to the tank 28.

The main valve 26 includes a pump port 38A, a first entrance/exit port 38B, a second entrance/exit port 38C, a tank port 38D, a neutral entrance port 38E, and a neutral exit port 38F. The pump port 38A is connected via an inflow flow passage 42 to the pump flow passage 23. The first entrance/exit port 38B is connected via a bottom flow passage 43 to a bottom chamber 35A of the boom cylinder 35. The second entrance/exit port 38C is connected via a rod flow passage 44 to a rod chamber 35B of the boom cylinder 35. The tank port 38D is connected via an outflow flow passage 45 to the tank flow passage 27. The neutral entrance port 38E is connected to a neutral flow passage 46. The neutral exit port 38F is connected to a neutral flow passage 47.

The boom spool 38 moves among a bottom position, a rod position, and a neutral position. If the boom spool 38 is disposed in the bottom position, hydraulic oil discharged from the main pump 22 is supplied via the inflow flow passage 42, the boom spool 38, and the bottom flow passage 43 to the bottom chamber 35A of the boom cylinder 35, and hydraulic oil ejected from the rod chamber 35B of the boom cylinder 35 is ejected via the rod flow passage 44, the boom spool 38, and the outflow flow passage 45 to the tank 28. If the boom spool 38 is disposed in the rod position, hydraulic oil discharged from the main pump 22 is supplied via the inflow flow passage 42, the boom spool 38, and the rod flow passage 44 to the rod chamber 35B of the boom cylinder 35, and hydraulic oil ejected from the bottom chamber 35A of the boom cylinder 35 is ejected via the bottom flow passage 43, the boom spool 38, and the outflow flow passage 45 to the tank 28. If the boom spool 38 is disposed in the neutral position, the boom spool 38 intercepts the passing of hydraulic oil.

The main valve 26 includes a pump port 39A, a first entrance/exit port 39B, a second entrance/exit port 39C, a tank port 39D, a neutral entrance port 39E, and a neutral exit port 39F. The pump port 39A is connected via an inflow flow passage 48 to the pump flow passage 23. The first entrance/exit port 39B is connected via a bottom flow passage 49 to a bottom chamber 36A of the arm cylinder 36. The second entrance/exit port 39C is connected via a rod flow passage 50 to a rod chamber 36B of the arm cylinder 36. The tank port 39D is connected via an outflow flow passage 51 to the tank flow passage 27. The neutral entrance port 39E is connected to a neutral flow passage 47. The neutral exit port 39F is connected to a neutral flow passage 52.

The arm spool 39 moves among a bottom position, a rod position, and a neutral position. If the arm spool 39 is disposed in the bottom position, hydraulic oil discharged from the main pump 22 is supplied via the inflow flow passage 48, the arm spool 39, and the bottom flow passage 49 to the bottom chamber 36A of the arm cylinder 36, and hydraulic oil ejected from the rod chamber 36B of the arm cylinder 36 is ejected via the rod flow passage 50, the arm spool 39, and the outflow flow passage 51 to the tank 28. If the arm spool 39 is disposed in the rod position, hydraulic oil discharged from the main pump 22 is supplied via the inflow flow passage 48, the arm spool 39, and the rod flow passage 50 to the rod chamber 36B of the arm cylinder 36, and hydraulic oil ejected from the bottom chamber 36A of the arm cylinder 36 is ejected via the bottom flow passage 49, the arm spool 39, and the outflow flow passage 51 to the tank 28. If the arm spool 39 is disposed in the neutral position, the arm spool 39 intercepts the passing of hydraulic oil.

The main valve 26 includes a pump port 40A, a first entrance/exit port 40B, a second entrance/exit port 40C, a tank port 40D, a neutral entrance port 40E, and a neutral exit port 40F. The pump port 40A is connected via an inflow flow passage 53 to the pump flow passage 23. The first entrance/exit port 40B is connected via a bottom flow passage 54 to a bottom chamber 37A of the bucket cylinder 37. The second entrance/exit port 40C is connected via a rod flow passage 55 to a rod chamber 37B of the bucket cylinder 37. The tank port 40D is connected via an outflow flow passage 56 to the tank flow passage 27. The neutral entrance port 40E is connected to a neutral flow passage 52. The neutral exit port 40F is connected to a neutral flow passage 57.

The bucket spool 40 moves among a bottom position, a rod position, and a neutral position. If the bucket spool 40 is disposed in the bottom position, hydraulic oil discharged from the main pump 22 is supplied via the inflow flow passage 53, the bucket spool 40, and the bottom flow passage 54 to the bottom chamber 37A of the bucket cylinder 37, and hydraulic oil ejected from the rod chamber 37B of the bucket cylinder 37 is ejected via the rod flow passage 55, the bucket spool 40, and the outflow flow passage 56 to the tank 28. If the bucket spool 40 is disposed in the rod position, hydraulic oil discharged from the main pump 22 is supplied via the inflow flow passage 53, the bucket spool 40, and the rod flow passage 55 to the rod chamber 37B of the bucket cylinder 37, and hydraulic oil ejected from the bottom chamber 37A of the bucket cylinder 37 is ejected via the bottom flow passage 54, the bucket spool 40, and the outflow flow passage 56 to the tank 28. If the bucket spool 40 is disposed in the neutral position, the bucket spool 40 intercepts the passing of hydraulic oil.

The main valve 26 includes a pump port 41A, a first entrance/exit port 41B, a second entrance/exit port 41C, a tank port 41D, a neutral entrance port 41E, and a neutral exit port 41F. The pump port 41A is connected via an inflow flow passage 58 to the pump flow passage 23. The first entrance/exit port 41B is connected via a first motor flow passage 59 to a first suction port 25A of the travel motor 25. The second entrance/exit port 41C is connected via a second motor flow passage 60 to a second suction port 25B of the travel motor 25. The tank port 41D is connected via an outflow flow passage 61 to the tank flow passage 27. The neutral entrance port 41E is connected to the pump flow passage 23. The neutral exit port 41F is connected to the neutral flow passage 46.

The travel spool 41 moves among a forward position, a reverse position, and a neutral position. If the travel spool 41 is disposed in the forward position, hydraulic oil discharged from the main pump 22 is supplied via the inflow flow passage 58, the travel spool 41, and the first motor flow passage 59 to the first suction port 25A of the travel motor 25, and hydraulic oil ejected from the second suction port 25B of the travel motor 25 is ejected via the second motor flow passage 60, the travel spool 41, and the outflow flow passage 61 to the tank 28. If the travel spool 41 is disposed in the reverse position, hydraulic oil discharged from the main pump 22 is supplied via the inflow flow passage 58, the travel spool 41, and the second motor flow passage 60 to the second suction port 25B of the travel motor 25, and hydraulic oil ejected from the first suction port 25A of the travel motor 25 is ejected via the first motor flow passage 59, the travel spool 41, and the outflow flow passage 61 to the tank 28. If the travel spool 41 is disposed in the neutral position, the travel spool 41 intercepts the passing of hydraulic oil.

In the embodiment, the inflow flow passage 42, the inflow flow passage 48, the inflow flow passage 53, and the inflow flow passage 58 are connected in parallel with the pump flow passage 23. The outflow flow passage 45, the outflow flow passage 51, the outflow flow passage 56, and the outflow flow passage 61 are connected in parallel with the tank flow passage 27.

In the example illustrated in FIG. 2, each of the boom spool 38, the arm spool 39, the bucket spool 40, and the travel spool 41 is disposed in the neutral position. The neutral flow passage 57 is connected to a negative control mechanism 62 that performs negative control on the displacement of the main pump 22. If each of the boom spool 38, the arm spool 39, the bucket spool 40, and the travel spool 41 is disposed in the neutral position, hydraulic oil discharged from the main pump 22 is ejected via the pump flow passage 23, the travel spool 41, the neutral flow passage 46, the boom spool 38, the neutral flow passage 47, the arm spool 39, the neutral flow passage 52, the bucket spool 40, the neutral flow passage 57, the negative control mechanism 62, and the tank flow passage 27 to the tank 28.

A boom check valve 63 is disposed on the inflow flow passage 42. An arm check valve 64 is disposed on the inflow flow passage 48. A bucket check valve 65 is disposed on the inflow flow passage 53. A travel check valve 66 is disposed on the inflow flow passage 58.

The boom check valve 63 prevents hydraulic oil from flowing backward from the boom cylinder 35 via the boom spool 38 to the main pump 22. The arm check valve 64 prevents hydraulic oil from flowing backward from the arm cylinder 36 via the arm spool 39 to the main pump 22. The bucket check valve 65 prevents hydraulic oil from flowing backward from the bucket cylinder 37 via the bucket spool 40 to the main pump 22. The travel check valve 66 prevents hydraulic oil from flowing backward from the travel motor 25 via the travel spool 41 to the main pump 22.

<Swing Hydraulic Circuit>

The swing pump 29 is a variable displacement hydraulic pump. The swing pump 29 is coupled to the power take-off 15. The swing pump 29 is driven by the engine 14. The swing pump 29 discharges hydraulic oil for driving the swing motor 30.

The swing motor 30 is a hydraulic motor. The swing motor 30 generates power for swinging the upper swing body 2. The swing motor 30 is driven on the basis of hydraulic oil that has been discharged from the swing pump 29.

The first main flow passage 31 connects a first discharge port 29A of the swing pump 29 to a first suction port 30A of the swing motor 30. The second main flow passage 32 connects a second discharge port 29B of the swing pump 29 to a second suction port 30B of the swing motor 30. The first main flow passage 31, the second main flow passage 32, the swing pump 29, and the swing motor 30 constitute a closed circuit.

The neutral hold valve 33 controls the passing of hydraulic oil between the swing pump 29 and the swing motor 30. The neutral hold valve 33 is disposed to be interposed between the first main flow passage 31 and the second main flow passage 32. The neutral hold valve 33 includes a spool 67. The neutral hold valve 33 operates on the basis of a control signal that has been output from the controller 21.

The neutral hold valve 33 includes a first pump port 67A, a second pump port 67B, a first motor port 67C, and a second motor port 67D. The first pump port 67A is connected via the first main flow passage 31 to the first discharge port 29A of the swing pump 29. The second pump port 67B is connected via the second main flow passage 32 to the second discharge port 29B of the swing pump 29. The first motor port 67C is connected via the first main flow passage 31 to the first suction port 30A of the swing motor 30. The second motor port 67D is connected via the second main flow passage 32 to the second suction port 30B of the swing motor 30.

The spool 67 moves among a first position, a second position, and a neutral position. If the spool 67 is disposed in the first position, the passing of hydraulic oil between the first pump port 67A and the first motor port 67C is intercepted, and the passing of hydraulic oil from the second motor port 67D to the second pump port 67B is allowed. If the spool 67 is disposed in the second position, the passing of hydraulic oil between the second pump port 67B and the second motor port 67D is intercepted, and the passing of hydraulic oil from the first motor port 67C to the first pump port 67A is allowed. If the spool 67 of the neutral hold valve 33 is disposed in the neutral position, the passing of hydraulic oil between the first pump port 67A and the first motor port 67C is intercepted, and the passing of hydraulic oil between the second pump port 67B and the second motor port 67D is intercepted.

The neutral hold valve 33 includes a first bypass flow passage 68 and a second bypass flow passage 69 that are disposed to bypass the spool 67. The first bypass flow passage 68 connects the first discharge port 29A of the swing pump 29 to the first suction port 30A of the swing motor 30. The second bypass flow passage 69 connects the second discharge port 29B of the swing pump 29 to the second suction port 30B of the swing motor 30.

A check valve 70 is disposed on the first bypass flow passage 68. A check valve 71 is disposed on the second bypass flow passage 69. The check valve 70 and the check valve 71 allow the passing of hydraulic oil from the swing pump 29 to the swing motor 30, and obstruct the passing of hydraulic oil from the swing motor 30 to the swing pump 29.

<Back Pressure Valve>

The back pressure valve 18 is disposed on the tank flow passage 27 between the main valve 26 and the tank 28. The back pressure valve 18 adjusts the back pressure of the main valve 26. The back pressure valve 18 adjusts, as the back pressure of the main valve 26, at least the pressure of the tank flow passage 27 between the main valve 26 and the back pressure valve 18.

The back pressure valve 18 opens the tank flow passage 27, and allows the passing of hydraulic oil from the main valve 26 to lower the back pressure of the main valve 26. The back pressure valve 18 throttles the tank flow passage 27, and restricts the passing of hydraulic oil from the main valve 26 to raise the back pressure of the main valve 26.

A spool of the back pressure valve 18 moves between an open position where the tank flow passage 27 is opened, and a throttle position where the tank flow passage 27 is throttled. In the embodiment, the back pressure valve 18 is of a normal closed type. An electromagnetic unit 18A is connected to a portion of the spool of the back pressure valve 18, and a spring 18B is connected to another portion. When the electromagnetic unit 18A is in an energization state, an action of the electromagnetic unit 18A causes the spool of the back pressure valve 18 to move to the open position. When the electromagnetic unit 18A is in a non-energization state, the action of the spring 18B causes the spool of the back pressure valve 18 to move to the throttle position.

The back pressure valve 18 opens the tank flow passage 27 to adjust the back pressure of the main valve 26 to a first back pressure. The back pressure valve 18 throttles the tank flow passage 27 to adjust the back pressure of the main valve 26 to a second back pressure. The second back pressure is higher than the first back pressure. As an example, the first back pressure is a gauge pressure of 0 [kg/cm$^2$]. The second back pressure is a gauge pressure of 8 [kg/cm$^2$].

In the description below, the tank flow passage 27 between the main valve 26 and the back pressure valve 18 is appropriately referred to as a first portion (an upstream portion) 27A of the tank flow passage 27, and the tank flow passage 27 between the back pressure valve 18 and the tank 28 is appropriately referred to as a second portion (a downstream portion) 27B of the tank flow passage 27.

<Relief Valve>

The relief valve 19 is connected via a relief flow passage 74 to the pump flow passage 23 between the main pump 22 and the main valve 26 (the travel spool 41). The relief valve 19 is also connected via a relief flow passage 75 to the first portion 27A of the tank flow passage 27. In the embodiment, the relief flow passage 75 is connected to the outflow flow passage 61. The outflow flow passage 61 is connected to the first portion 27A of the tank flow passage 27. The relief valve 19 is connected via the relief flow passage 75 and the outflow flow passage 61 to the first portion 27A of the tank flow passage 27.

The relief valve 19 is opened when the discharge pressure of the main pump 22 is greater than or equal to a predetermined relief pressure. The discharge pressure of the main pump 22 includes the pressure of hydraulic oil of the pump flow passage 23. If the relief valve 19 is opened, hydraulic oil flows out of the relief valve 19 to the relief flow passage 75. The hydraulic oil that has flowed out of the relief valve 19 is supplied via the outflow flow passage 61 to the first portion 27A.

<Temperature Sensor>

The temperature sensor 20 detects the temperature of hydraulic oil on the tank flow passage 27. In the embodiment, the temperature sensor 20 detects the temperature of hydraulic oil in the second portion 27B. Note that it is sufficient if the temperature sensor can detect the temperature of hydraulic oil on the tank flow passage 27, and a position of disposition is not limited. The temperature sensor 20 may be provided on a side of a low-pressure circuit such as suction piping of a pump.

<Controller>

Figure 3:
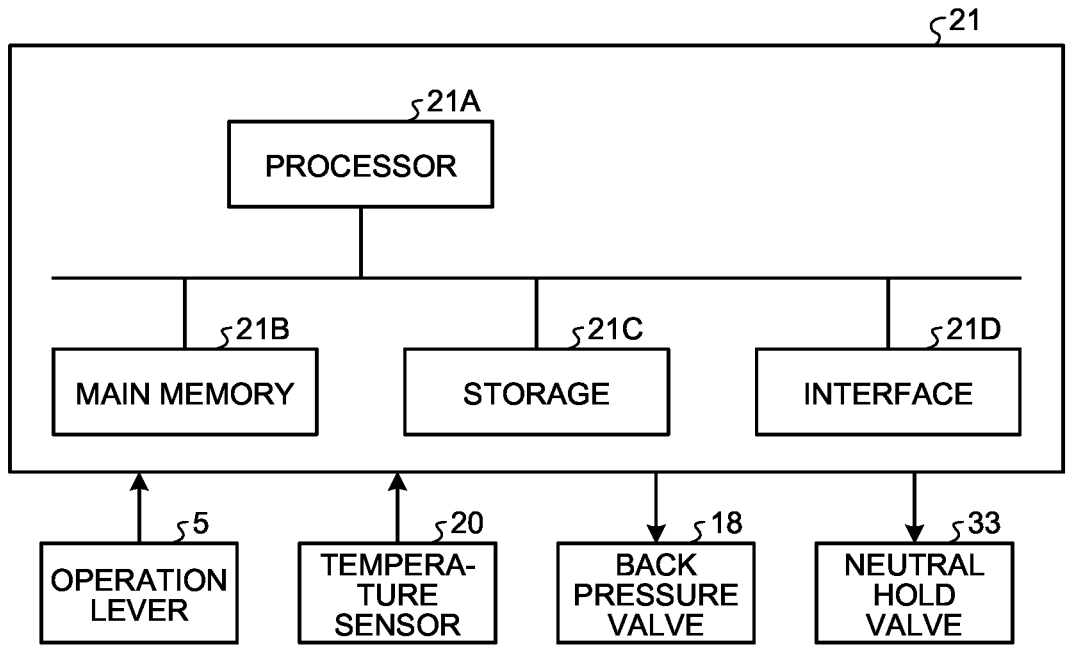
FIG. 3 is a block diagram illustrating a controller according to the embodiment.

FIG. 3 is a block diagram illustrating the controller 21 according to the embodiment. The controller 21 includes a computer system. The controller 21 includes a processor 21A such as a central processing unit (CPU), a main memory 21B including a non-volatile memory such as a read only memory (ROM) and a volatile memory such as a random access memory (RAM), a storage 21C, and an interface 21D including an input/output circuit. Functions of the controller 21 are stored as a computer program in the storage 21C. The processor 21A reads the computer program from the storage 21C, decompresses the computer program in the main memory 21B, and performs specified processing according to the computer program. Note that the computer program may be distributed via a network to the controller 21.

The controller 21 controls at least the back pressure valve 18. The controller 21 controls the back pressure valve 18 in such a way that the back pressure of the main valve 26 changes from the first back pressure to the second back pressure that is higher than the first back pressure. Stated another way, the controller 21 controls the back pressure valve 18 in such a way that the tank flow passage 27 changes from an open state to a throttled state. As described above, in the embodiment, the back pressure valve 18 is of a normal closed type. The controller 21 outputs a control signal to causes the electromagnetic unit 18A to enter into the energization state, and therefore the spool of the back pressure valve 18 can be moved from the open position to the throttle position.

The controller 21 controls the back pressure valve 18 on the basis of a detection value of the temperature sensor 20. The controller 21 adjusts the back pressure to the second back pressure, when the detection value of the temperature sensor 20 is less than or equal to a predetermined specified value. The specified value is, for example, 40 [° C.].

Furthermore, the controller 21 controls the neutral hold valve 33. The controller 21 controls the neutral hold valve 33 on the basis of an operation signal of the operation lever 5 that has been operated to swing the upper swing body 2. The controller 21 adjusts a pilot pressure that acts on a pressure chamber at an end of the spool 67, and therefore the spool 67 can be moved among the first position, the second position, and the neutral position.

The operation lever 5 is operated by the operator of the excavator 1. If the operation lever 5 has been operated to swing the upper swing body 2, an operation signal that corresponds to an operation amount and an operation direction of the operation lever 5 is output from the operation lever 5.

The controller 21 outputs, to the neutral hold valve 33, a control signal that corresponds to the operation amount and the operation direction of the operation lever 5, on the basis of the operation signal from the operation lever 5.

In a case where the operation lever 5 is disposed in the neutral position, a tilt angle of a swash plate of the swing pump 29 becomes zero. In a case where the tilt angle of the swash plate is zero, even if the engine 14 has been started to drive the swing pump 29, an amount of discharge of hydraulic oil from the swing pump 29 is zero, and therefore the swing motor 30 does not rotate.

If the neutral hold valve 33 is disposed in the neutral position, the passing of hydraulic oil from the swing motor 30 to the swing pump 29 is obstructed. Furthermore, the first bypass flow passage 68 and the second bypass flow passage 69 are provided with the check valve 70 and the check valve 71 that obstruct the passing of hydraulic oil from the swing motor 30 to the swing pump 29. Therefore, for example, even if the excavator 1 has been stopped on a slope, and external force that swings the upper swing body 2 has acted on the upper swing body 2, a stopping state of the swing motor 30 is maintained, and therefore the upper swing body 2 is prevented from accidentally swinging.

If the operation lever 5 has been operated by the operator to swing the upper swing body 2, a control signal that corresponds to an operation amount and an operation direction of the operation lever 5 is output from the controller 21 to the neutral hold valve. The tilt angle of the swash plate of the swing pump 29 has been changed, and the spool 67 of the neutral hold valve 33 moves from the neutral position to the first position or the second position.

For example, if hydraulic oil has been discharged from the first discharge port 29A of the swing pump 29 and the spool 67 of the neutral hold valve 33 has moved to the first position, hydraulic oil that has been discharged from the first discharge port 29A of the swing pump 29 to the first main flow passage 31 is supplied via the first bypass flow passage 68 to the first suction port 30A of the swing motor 30. The hydraulic oil supplied to the swing motor 30 is discharged from the second suction port 30B to the second main flow passage 32, and is then supplied via the neutral hold valve 33 to the second discharge port 29B of the swing pump 29. In this case, the upper swing body 2 swings, for example, clockwise.

For example, if hydraulic oil has been discharged from the second discharge port 29B of the swing pump 29, and the spool 67 of the neutral hold valve 33 has moved to the second position, hydraulic oil that has been discharged from the second discharge port 29B of the swing pump 29 to the second main flow passage 32 is supplied via the second bypass flow passage 69 to the second suction port 30B of the swing motor 30. The hydraulic oil supplied to the swing motor 30 is discharged from the first suction port 30A to the first main flow passage 31, and is then supplied via the neutral hold valve 33 to the first discharge port 29A of the swing pump 29. In this case, the upper swing body 2 swings, for example, counterclockwise.

[Warming-Up of Neutral Hold Valve]

Figure 4:
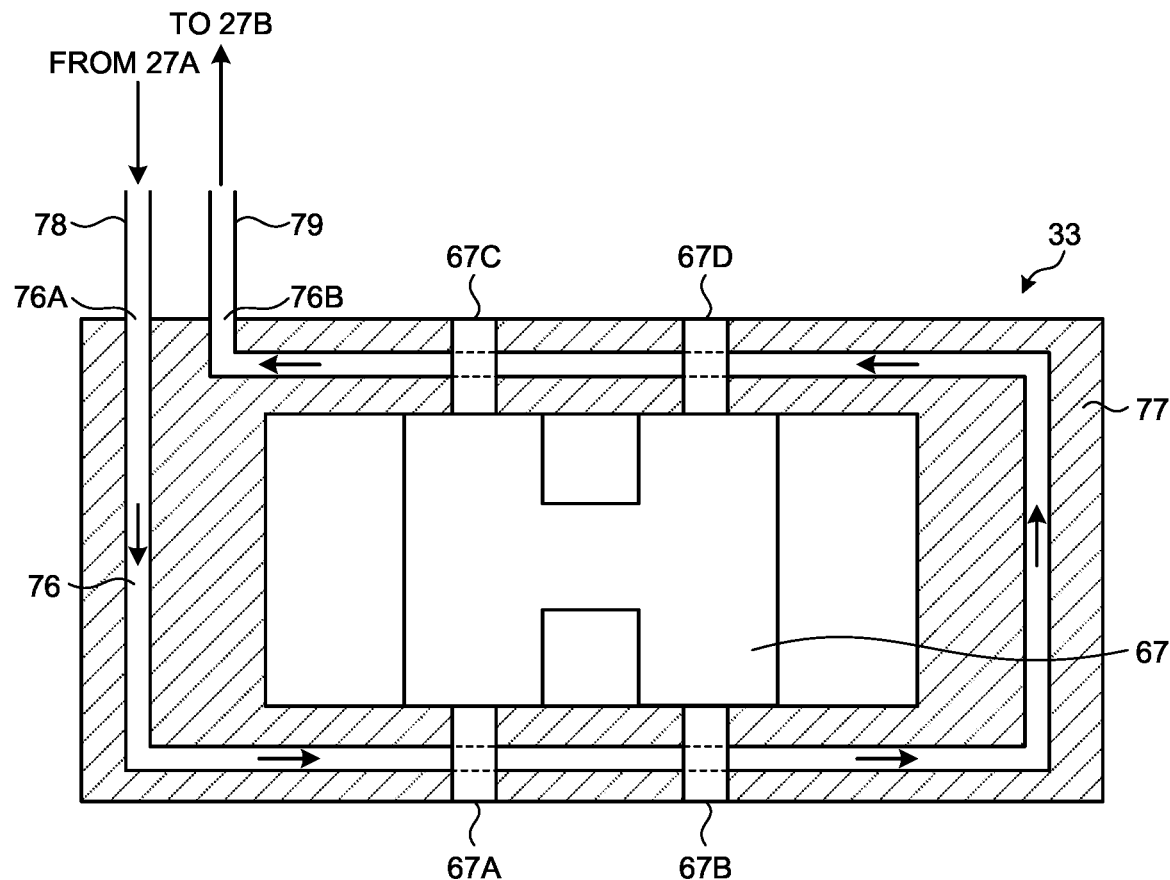
FIG. 4 is a diagram schematically illustrating a neutral hold valve according to the embodiment.

FIG. 4 is a diagram schematically illustrating the neutral hold valve 33 according to the embodiment. As illustrated in FIG. 4, the neutral hold valve 33 includes the spool 67, and a body 77 that is disposed around the spool 67. As illustrated in FIGS. 2 and 4, in the neutral hold valve 33, a warming-up flow passage 76 that is disposed around the spool 67 of the neutral hold valve 33 is formed in the body 77. The body 77 movably supports the spool 67. The warming-up flow passage 76 is disposed in the body 77. In the embodiment, the warming-up flow passage 76 is formed inside the body 77. Note that the warming-up flow passage 76 may be a flow passage of a tube that is disposed to come into contact with an outer face of the body 77.

The warming-up flow passage 76 includes an entrance port 76A and an exit port 76B. Warm hydraulic oil flows via the entrance port 76A into the warming-up flow passage 76, and flows through the warming-up flow passage 76, and therefore the neutral hold valve 33 is warmed up. The hydraulic oil that has flowed through the warming-up flow passage 76 flows out of the exit port 76B. The warming-up flow passage 76 is formed in a position that is different from positions where the first pump port 67A, the second pump port 67B, the first motor port 67C, and the second motor port 67D are formed in the body 77, and is not connected to the first pump port 67A, the second pump port 67B, the first motor port 67C, and the second motor port 67D.

As illustrated in FIGS. 2 and 4, the hydraulic system 13 includes a supply flow passage 78 that is connected to the entrance port 76A of the warming-up flow passage 76, and an ejection flow passage 79 that is connected to the exit port 76B of the warming-up flow passage 76. The supply flow passage 78 connects the first portion 27A of the tank flow passage 27 between the main valve 26 and the back pressure valve 18 to the entrance port 76A of the warming-up flow passage 76. The ejection flow passage 79 connects the second portion 27B of the tank flow passage 27 between the back pressure valve 18 and the tank 28 to the exit port 76B of the warming-up flow passage 76.

As described above, the relief valve 19 is opened when the discharge pressure of the main pump 22 is greater than or equal to the relief pressure. If the relief valve 19 is opened, hydraulic oil flows out of the relief valve 19. When hydraulic oil flows out of the relief valve 19, pressure energy of the hydraulic oil is converted into thermal energy, and the temperature of the hydraulic oil increases. Stated another way, the hydraulic oil that flows out of the relief valve 19 is warm.

The warm hydraulic oil that has flowed out of the relief valve 19 is supplied via the outflow flow passage 61 to the first portion 27A. Stated another way, warm hydraulic oil is supplied to the first portion 27A. The warm hydraulic oil that has flowed out of the relief valve 19 is supplied via the first portion 27A, the supply flow passage 78, and the entrance port 76A to the warming-up flow passage 76. The warm hydraulic oil flows through the warming-up flow passage 76, and therefore the neutral hold valve 33 is warmed up. The hydraulic oil that has flowed through the warming-up flow passage 76 flows out of the exit port 76B, and is ejected via the second portion 27B to the tank 28.

[Control Method]

Figure 5:
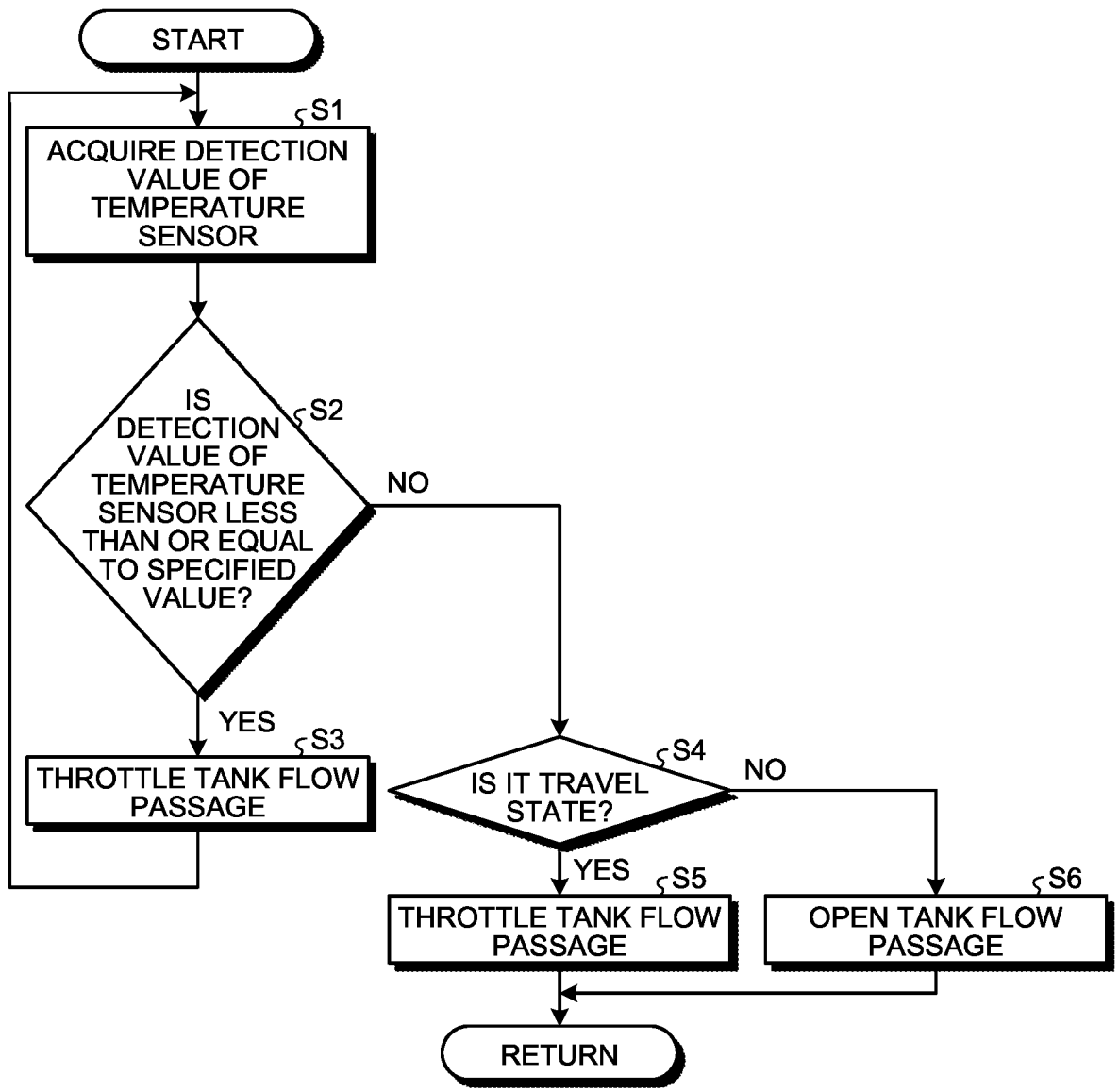
FIG. 5 is a flowchart illustrating a control method of the excavator according to the embodiment.

FIG. 5 is a flowchart illustrating a control method of the excavator 1 according to the embodiment. As the control method of the excavator 1, a warming-up method of the neutral hold valve 33 is described with reference to FIG. 5.

If a key-on operation has been performed on the excavator 1 to start the excavator 1, the temperature sensor 20 detects the temperature of hydraulic oil. The controller 21 acquires a detection value of the temperature sensor 20 (Step S1).

The controller 21 determined whether the detection value of the temperature sensor 20 indicating the temperature of the hydraulic oil is less than or equal to a predetermined specified value (Step S2).

In Step S2, in a case where it has been determined that the detection value of the temperature sensor 20 is less than or equal to the specified value (Step S2: Yes), the controller 21 determines that warming-up of the neutral hold valve 33 will be needed.

The controller 21 controls the back pressure valve 18 to throttle the tank flow passage 27. The tank flow passage 27 is closed, and this causes the back pressure of the main valve 26 to be adjusted to the second back pressure (Step S3).

Figure 6:
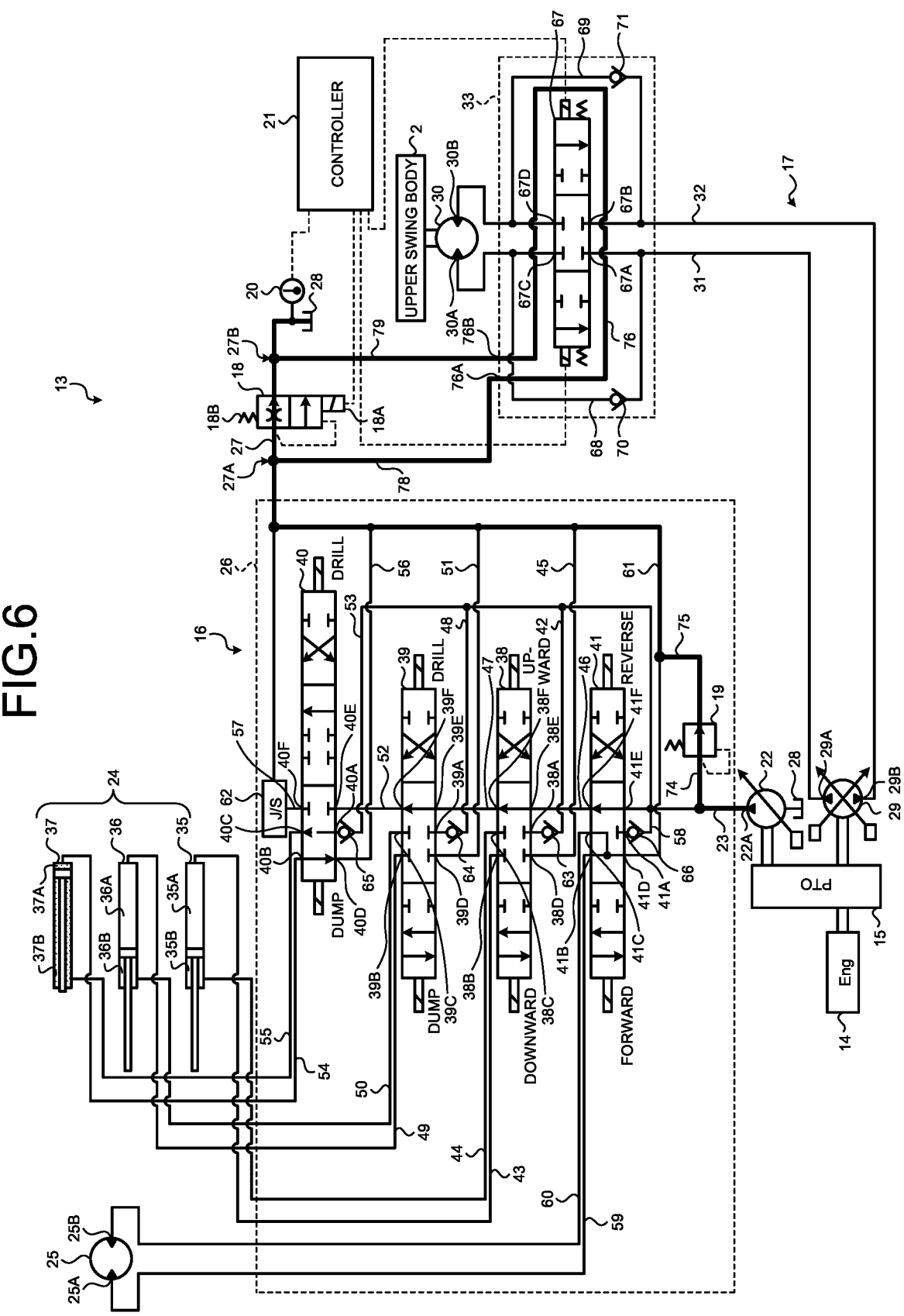
FIG. 6 is a diagram illustrating the hydraulic system at a time when the neutral hold valve according to the embodiment is warmed up.

FIG. 6 is a diagram illustrating the hydraulic system 13 at a time when the neutral hold valve 33 according to the embodiment is warmed up. As illustrated in FIG. 6, in a case where air in the neutral hold valve 33 is warmed, the controller 21 adjusts the back pressure of the main valve 26 to the second back pressure in order to supply hydraulic oil from the first portion 27A to the warming-up flow passage 76. If the back pressure of the main valve 26 has increased, supply of hydraulic oil from the first portion 27A of the tank flow passage 27 to the warming-up flow passage 76 is promoted.

In the embodiment, warming-up of the main valve 26 is performed in parallel with warming-up of the neutral hold valve 33. In a case where warming-up of the neutral hold valve 33 and warming-up of the main valve 26 are performed, the discharge pressure of the main pump 22 is increased to be greater than or equal to the relief pressure.

As illustrated in FIG. 6, the operator of the excavator 1 operates the operation lever 5, for example, in such a way that a piston of the bucket cylinder 37 reaches an end (a stroke end) of a movable range of the piston. In the example illustrated in FIG. 6, the operator of the excavator 1 operates the operation lever 5 in such a way that the piston is disposed closest to a bottom side within the movable range of the piston. By disposing the piston closest to the bottom side, the bucket cylinder 37 is most shrunk. In a state where the piston is disposed closest to the bottom side, if hydraulic oil continues to be supplied from the main pump 22 to the rod chamber 37B of the bucket cylinder 37, the pressure of hydraulic oil of each of the pump flow passage 23, the inflow flow passage 53, the rod flow passage 55, and the rod chamber 37B increases.

If the pressure of hydraulic oil has increased, and the pressure of hydraulic oil of each of the pump flow passage 23, the inflow flow passage 53, and the rod flow passage 55, and the rod chamber 37B becomes greater than or equal to the relief pressure, the relief valve 19 is opened. If the relief valve 19 is opened, hydraulic oil flows out of the relief valve 19 via the relief flow passage 75 to the outflow flow passage 61. As described above, the hydraulic oil that flows out of the relief valve 19 is warm. The warm hydraulic oil that has flowed out of the relief valve 19 is supplied via the first portion 27A and the supply flow passage 78 to the warming-up flow passage 76. This warms up the neutral hold valve 33.

The hydraulic oil that has flowed through the warming-up flow passage 76 flows out of the exit port 76B, and is supplied via the ejection flow passage 79 to the second portion 27B. The pressure of the second portion 27B is lower than the second back pressure. Therefore, the hydraulic oil that has flowed through the warming-up flow passage 76 can flow via the exit port 76B and the ejection flow passage 79 to the second portion 27B. The hydraulic oil that has been supplied to the second portion 27B is ejected to the tank 28.

Furthermore, as illustrated in FIG. 6, the warm hydraulic oil that has flowed out of the relief valve 19 is supplied to each of the outflow flow passage 45, the outflow flow passage 51, the outflow flow passage 56, the first motor flow passage 59, and the second motor flow passage 60. Furthermore, when hydraulic oil flows out of the bottom chamber 37A of the bucket cylinder 37, pressure energy of the hydraulic oil is converted into thermal energy, and the temperature of the hydraulic oil increases. Stated another way, the hydraulic oil that flows out of the bottom chamber 37A of the bucket cylinder 37 is warm. The hydraulic oil that has flowed out of the bottom chamber 37A of the bucket cylinder 37 is supplied to the bottom flow passage 54. The hydraulic oil that has flowed out of the relief valve 19 and the hydraulic oil that has flowed out of the bucket cylinder 37 warm up the main valve 26.

Note that in FIG. 6, a flow passage illustrated with a thick solid line is a flow passage that warmed-up hydraulic oil passes through.

Note that FIG. 6 illustrates a state where the piston of the bucket cylinder 37 has reached the stroke end. In order to make the discharge pressure of the main pump 22 greater than or equal to the relief pressure, the operation lever 5 may be operated in such a way that a piston of the boom cylinder 35 reaches a stroke end, or the operation lever 5 may be operated in such a way that a piston of the arm cylinder 36 reached a stroke end.

The controller 21 controls the back pressure valve 18 to continue to close the tank flow passage 27 until the detection value of the temperature sensor 20 exceeds the specified value.

In a state where the tank flow passage 27 is throttled, the controller 21 acquires the detection value of the temperature sensor 20 (Step S1), and determines whether the detection value of the temperature sensor 20 is less than or equal to the specified value (Step S2).

In Step S2, in a case where it has been determined that the detection value of the temperature sensor 20 is not less than or equal to the specified value (Step S2: No), the controller 21 determines that warming-up of the neutral hold valve 33 will not be needed. In a case where warming-up of the neutral hold valve 33 is not needed, the controller 21 does not perform control on the back pressure valve 18. In a case where a control signal has been output from the controller 21 to the back pressure valve 18, the back pressure valve 18 operates to open the tank flow passage 27. The tank flow passage 27 is opened, and this causes the back pressure of the main valve 26 to be adjusted to the first back pressure.

In a case where the neutral hold valve 33 has been warmed up, the operator of the excavator 1 can operate the operation lever 5 to operate the excavator 1 in a state where the back pressure of the main valve 26 has been adjusted to the first back pressure.

By operating the working equipment 3 in a state where the back pressure of the main valve 26 has been adjusted to the first back pressure, fuel consumption of the excavator 1 is reduced. The working equipment 3 is driven by the thrust generated by a difference between the rod pressure of a cylinder and pressure on a head side. In a state where the back pressure of the main valve 26 has been adjusted to the first back pressure, the back pressure decreases, and therefore even if the discharge pressure of the main pump 22 is low, cylinder differential pressure required to drive the working equipment 3 can be acquired. As a result, in a state where the back pressure of the main valve 26 is low, even if an output of the engine 14 is low, and the discharge pressure of the main pump 22 is low, hydraulic oil can be supplied to the working equipment cylinder 24 having a pressure required to operate the working equipment 3, and therefore fuel consumption of the excavator 1 is reduced.

In a state where the operation lever 5 has been operated to drive the travel motor 25, and the lower travel body 4 is traveling, in a case where the operation lever 5 has been returned to the neutral position, the travel spool 41 is disposed in the neutral position, and the inflow of hydraulic oil from the main pump 22 to the travel motor 25 is restricted. In contrast, even if the operation lever 5 has been returned to the neutral position, the lower travel body 4 continues to travel by inertia (momentum), and therefore the travel motor 25 continues to be driven. In a state where the inflow of hydraulic oil from the main pump 22 to the travel motor 25 is restricted, if the travel motor 25 continues to be driven, there is a possibility that at least a portion of the travel motor 25 will be under negative pressure. If at least a portion of the travel motor 25 is under negative pressure, there is a possibility that cavitation will occur in the travel motor 25. If cavitation has occurred, there is a possibility of the occurrence of malfunction in the travel motor 25.

In the embodiment, the controller 21 determines whether it is in an inertia travel state where the inflow of hydraulic oil from the main pump 22 to the travel motor 25 is restricted in a state where the back pressure of the main valve 26 has been adjusted to the first back pressure, and the travel motor 25 is driven (Step S4).

In Step S4, in a case where it has been determined that it is in the inertia travel state where the inflow of hydraulic oil to the travel motor 25 is restricted, and the travel motor 25 is driven (Step S4: Yes), the controller 21 controls the back pressure valve 18 to close the tank flow passage 27 in a state where the main pump 22 is driven. The tank flow passage 27 is closed in a state where the main pump 22 is driven, and this causes the back pressure of the main valve 26 to be adjusted to the second back pressure (Step S5).

If the back pressure of the main valve 26 has increased, for example, hydraulic oil of the tank flow passage 27 is supplied via the outflow flow passage 61, the travel spool 41, and the first motor flow passage 59 or the second motor flow passage 60 to the travel motor 25. Stated another way, if the back pressure of the main valve 26 has increased, supply of hydraulic oil from the tank flow passage 27 to the travel motor 25 is promoted. This prevents the travel motor 25 from becoming under negative pressure, and prevents cavitation from occurring.

In Step S4, in a case where it has been determined that the travel motor 25 is not driven (Step S4: No), the tank flow passage 27 is opened (Step S6).

Hereafter, the controller 21 repeats the processing described above in control relating to the back pressure valve 18, until a key-off operation is performed on the excavator 1.

Advantageous Effects

As described above, according to the embodiment, the hydraulic system 13 includes the main hydraulic circuit 16 that is constituted by an open circuit, and the swing hydraulic circuit 17 that is constituted by a closed circuit. The main hydraulic circuit 16 includes the main pump 22, the working equipment cylinder 24, the main valve 26 that controls the inflow of hydraulic oil from the main pump 22 to the working equipment cylinder 24, and the tank 28 that is supplied with the hydraulic oil that has flowed out of the working equipment cylinder 24, via the main valve 26. The swing hydraulic circuit 17 includes the swing pump 29, the swing motor 30, and the neutral hold valve 33 that controls the passing of hydraulic oil between the swing pump 29 and the swing motor 30. Furthermore, the hydraulic system 13 includes the back pressure valve 18 that is disposed on the tank flow passage 27 between the main valve 26 and the tank 28 and adjusts the back pressure of the main valve 26, the warming-up flow passage 76 that is disposed around the spool 67 of the neutral hold valve 33, the supply flow passage 78 that connects the first portion 27A of the tank flow passage 27 between the main valve 26 and the back pressure valve 18 to the entrance port 76A of the warming-up flow passage 76, and the ejection flow passage 79 that connects the second portion 27B of the tank flow passage 27 between the back pressure valve 18 and the tank 28 to the exit port 76B of the warming-up flow passage 76.

As a result, warm hydraulic oil supplied from the main hydraulic circuit 16 flows through the warming-up flow passage 76. The warm hydraulic oil flows through the warming-up flow passage 76, and therefore the neutral hold valve 33, which is one type of hydraulic equipment, is warmed up.

In a state where the neutral hold valve 33 has not been warmed up, if high-temperature hydraulic oil is suddenly supplied to the neutral hold valve 33, there is a possibility of the occurrence of malfunction in the neutral hold valve 33. For example, in a case where heat capacity of the spool 67 is different from heat capacity of the body 77, if high-temperature hydraulic oil is suddenly supplied to the neutral hold valve 33 that has not been warmed up, there is a possibility of the occurrence of a phenomenon of fixation of the spool 67 to the body 77 due to a difference between an amount of thermal expansion of the spool 67 and an amount of thermal expansion of the body 77. If the spool 67 is fixed to the body 77, there is a possibility of the occurrence of malfunction in the neutral hold valve 33.

According to the embodiment, warm hydraulic oil supplied from the main hydraulic circuit 16 warms up the neutral hold valve 33. Therefore, a phenomenon of fixation of the spool 67 to the body 77 is prevented from occurring. Accordingly, malfunction in the neutral hold valve 33 is prevented from occurring.

In the embodiment, the warming-up flow passage 76 is disposed in the body 77 of the neutral hold valve 33. This properly warms up the neutral hold valve 33.

The main hydraulic circuit 16 includes the relief valve 19 that is connected to the pump flow passage 23 between the main pump 22 and the main valve 26, and is opened when the discharge pressure of the main pump 22 is greater than or equal to a predetermined relief pressure. When hydraulic oil flows out of the relief valve 19, pressure energy of the hydraulic oil is converted into thermal energy, and the temperature of the hydraulic oil increases. Warm hydraulic oil that has flowed out of the relief valve 19 is supplied via the first portion 27A and the supply flow passage 78 to the warming-up flow passage 76, and therefore the neutral hold valve 33 is warmed up.

In the embodiment, the controller 21 controls the back pressure valve 18 in such a way that the back pressure of the main valve 26 changes from the first back pressure to the second back pressure that is higher than the first back pressure. An increase in the back pressure of the main valve 26 promotes supply of hydraulic oil from the first portion 27A of the tank flow passage 27 to the warming-up flow passage 76. Accordingly, the neutral hold valve 33 is properly warmed up.

In the embodiment, the temperature of hydraulic oil of the tank flow passage 27 is detected by the temperature sensor 20. The controller 21 increases the back pressure of the main valve 26 to the second back pressure, when a detection value of the temperature sensor 20 is less than or equal to a predetermined specified value. This properly warms up the neutral hold valve 33 when warming-up is needed.

In the embodiment, the controller 21 increases the back pressure of the main valve 26 to the second back pressure, when it is in the inertia travel state where the inflow of hydraulic oil to the travel motor 25 is restricted, and the travel motor 25 is driven. This prevents cavitation from occurring in the travel motor 25.

ANOTHER EMBODIMENT

In the embodiment described above, the back pressure valve 18 may be incorporated into the main valve 26.

REFERENCE SIGNS LIST

1 EXCAVATOR
2 UPPER SWING BODY
3 WORKING EQUIPMENT
4 LOWER TRAVEL BODY
5 OPERATION LEVER
6 CAB
7 DRIVER'S SEAT
8 BOOM
9 ARM
10 BUCKET
11 DRIVE WHEEL
12 CRAWLER
13 HYDRAULIC SYSTEM
14 ENGINE
15 POWER TAKE-OFF
16 MAIN HYDRAULIC CIRCUIT
17 SWING HYDRAULIC CIRCUIT
18 BACK PRESSURE VALVE
18A ELECTROMAGNETIC UNIT
18B SPRING
19 RELIEF VALVE
20 TEMPERATURE SENSOR
21 CONTROLLER
21A PROCESSOR
21B MAIN MEMORY
21C STORAGE
21D INTERFACE
22 MAIN PUMP
22A DISCHARGE PORT
23 PUMP FLOW PASSAGE
24 WORKING EQUIPMENT CYLINDER
25 TRAVEL MOTOR
25A FIRST SUCTION PORT
25B SECOND SUCTION PORT
26 MAIN VALVE
27 TANK FLOW PASSAGE
27A FIRST PORTION
27B SECOND PORTION
28 TANK
29 SWING PUMP
29A FIRST DISCHARGE PORT
29B SECOND DISCHARGE PORT
30 SWING MOTOR
30A FIRST SUCTION PORT
30B SECOND SUCTION PORT
31 FIRST MAIN FLOW PASSAGE
32 SECOND MAIN FLOW PASSAGE
33 NEUTRAL HOLD VALVE
35 BOOM CYLINDER
35A BOTTOM CHAMBER
35B ROD CHAMBER
36 ARM CYLINDER
36A BOTTOM CHAMBER
36B ROD CHAMBER
37 BUCKET CYLINDER
37A BOTTOM CHAMBER
37B ROD CHAMBER
38 BOOM SPOOL
38A PUMP PORT
38B FIRST ENTRANCE/EXIT PORT
38C SECOND ENTRANCE/EXIT PORT
38D TANK PORT
38E NEUTRAL ENTRANCE PORT
38F NEUTRAL EXIT PORT
39 ARM SPOOL
39A PUMP PORT
39B FIRST ENTRANCE/EXIT PORT
39C SECOND ENTRANCE/EXIT PORT
39D TANK PORT
39E NEUTRAL ENTRANCE PORT
39F NEUTRAL EXIT PORT
40 BUCKET SPOOL
40A PUMP PORT
40B FIRST ENTRANCE/EXIT PORT
40C SECOND ENTRANCE/EXIT PORT
40D TANK PORT
40E NEUTRAL ENTRANCE PORT
40F NEUTRAL EXIT PORT
41 TRAVEL SPOOL
41A PUMP PORT
41B FIRST ENTRANCE/EXIT PORT
41C SECOND ENTRANCE/EXIT PORT
41D TANK PORT
41E NEUTRAL ENTRANCE PORT
41F NEUTRAL EXIT PORT
42 INFLOW FLOW PASSAGE
43 BOTTOM FLOW PASSAGE
44 ROD FLOW PASSAGE
45 OUTFLOW FLOW PASSAGE
46 NEUTRAL FLOW PASSAGE
47 NEUTRAL FLOW PASSAGE
48 INFLOW FLOW PASSAGE
49 BOTTOM FLOW PASSAGE
50 ROD FLOW PASSAGE

51 OUTFLOW FLOW PASSAGE
52 NEUTRAL FLOW PASSAGE
53 INFLOW FLOW PASSAGE
54 BOTTOM FLOW PASSAGE
55 ROD FLOW PASSAGE
56 OUTFLOW FLOW PASSAGE
57 NEUTRAL FLOW PASSAGE
58 INFLOW FLOW PASSAGE
59 FIRST MOTOR FLOW PASSAGE
60 SECOND MOTOR FLOW PASSAGE
61 OUTFLOW FLOW PASSAGE
62 NEGATIVE CONTROL MECHANISM
63 BOOM CHECK VALVE
64 ARM CHECK VALVE
65 BUCKET CHECK VALVE
66 TRAVEL CHECK VALVE
67 SPOOL
67A FIRST PUMP PORT
67B SECOND PUMP PORT
67C FIRST MOTOR PORT
67D SECOND MOTOR PORT
68 FIRST BYPASS FLOW PASSAGE
69 SECOND BYPASS FLOW PASSAGE
70 CHECK VALVE
71 CHECK VALVE
74 RELIEF FLOW PASSAGE
75 RELIEF FLOW PASSAGE
76 WARMING-UP FLOW PASSAGE
76A ENTRANCE PORT
76B EXIT PORT
77 BODY
78 SUPPLY FLOW PASSAGE
79 EJECTION FLOW PASSAGE

The invention claimed is:

1. A hydraulic system comprising:
a main hydraulic valve that is constituted by an open circuit that includes a main pump, a working equipment cylinder, a main valve that controls inflow of hydraulic oil from the main pump to the working equipment cylinder, and a tank to which the hydraulic oil that has flowed out of the working equipment cylinder is ejected via the main valve;
a swing hydraulic circuit that is constituted by a closed circuit that includes a swing pump, a swing motor, and a neutral hold valve that controls passing of the hydraulic oil between the swing pump and the swing motor;
a back pressure valve that is disposed on a tank flow passage between the main valve and the tank, and adjusts back pressure of the main valve;
a warming-up flow passage that is disposed around a spool of the neutral hold valve;
a supply flow passage that connects an upstream portion of the tank flow passage between the main valve and the back pressure valve to an entrance port of the warming-up flow passage; and
an ejection flow passage that connects a downstream portion of the tank flow passage between the back pressure valve and the tank to an exit port of the warming-up flow passage.

2. The hydraulic system according to claim 1,
wherein the neutral hold valve includes a body that is disposed around the spool, and
the warming-up flow passage is disposed in the body.

3. The hydraulic system according to claim 1, further comprising
a relief valve that is connected to a pump flow passage between the main pump and the main valve, and is opened when discharge pressure of the main pump is greater than or equal to relief pressure that has been predetermined,
wherein the hydraulic oil that has flowed out of the relief valve is supplied to the warming-up flow passage via the upstream portion and the supply flow passage.

4. The hydraulic system according to claim 1, further comprising
a controller that controls the back pressure valve to cause the back pressure to change from first back pressure to second back pressure that is higher than the first back pressure,
wherein the controller adjusts the back pressure to the second back pressure to supply the hydraulic oil from the upstream portion to the warming-up flow passage.

5. The hydraulic system according to claim 4, further comprising
a temperature sensor that detects temperature of the hydraulic oil of the tank flow passage,
wherein the controller adjusts the back pressure to the second back pressure when a detection value of the temperature sensor is less than or equal to a specified value that has been predetermined.

6. The hydraulic system according to claim 4,
wherein the main hydraulic circuit includes a travel motor,
the main valve controls the inflow of the hydraulic oil from the main pump to the travel motor, and
the controller adjusts the back pressure to the second back pressure when the inflow of the hydraulic oil to the travel motor is restricted, and the travel motor is driven.

7. An excavator comprising:
the hydraulic system according to claim 1;
an upper swing body that swings by using the swing motor; and
working equipment that is coupled to the upper swing body and operates by using the working equipment cylinder.

8. A control method of an excavator that includes:
a main hydraulic circuit that is constituted by an open circuit that includes a main pump, a working equipment cylinder, a main valve that controls inflow of hydraulic oil from the main pump to the working equipment cylinder, and a tank to which the hydraulic oil that has flowed out of the working equipment cylinder is ejected via the main valve;
a swing hydraulic circuit that is constituted by a closed circuit that includes a swing pump, a swing motor, and a neutral hold valve that controls passing of the hydraulic oil between the swing pump and the swing motor; and
a back pressure valve that is disposed on a tank flow passage between the main valve and the tank, and adjusts back pressure of the main valve, the control method comprising:
causing the hydraulic oil to flow into a warming-up flow passage that is disposed around a spool of the neutral hold valve from an upstream portion of the tank flow passage between the main valve and the back pressure valve; and
causing the hydraulic oil to flow out of the warming-up flow passage to a downstream portion of the tank flow passage between the back pressure valve and the tank.

9. The control method of the excavator according to claim 8, wherein the back pressure of the main valve is increased by using the back pressure valve, and the hydraulic oil is caused to flow into the warming-up flow passage.

* * * * *